United States Patent
Park et al.

(10) Patent No.: US 10,036,888 B2
(45) Date of Patent: Jul. 31, 2018

(54) APPARATUS AND METHOD FOR SINGLE-CHANNEL DIGITAL OPTICAL PHASE CONJUGATION

(71) Applicant: Korea Advanced Institute of Science and Technology, Daejeon (KR)

(72) Inventors: YongKeun Park, Daejeon (KR); Kyeo Reh Lee, Chungcheongnam-do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 181 days.

(21) Appl. No.: 14/579,636

(22) Filed: Dec. 22, 2014

(65) Prior Publication Data

US 2016/0085135 A1 Mar. 24, 2016

(30) Foreign Application Priority Data

Sep. 19, 2014 (KR) ......................... 10-2014-0124924

(51) Int. Cl.
| | |
|---|---|
| *G02B 26/08* | (2006.01) |
| *G02F 1/29* | (2006.01) |
| *H04B 10/12* | (2006.01) |
| *G02B 27/00* | (2006.01) |
| *G02B 26/06* | (2006.01) |
| *H04B 10/516* | (2013.01) |
| *H04B 10/548* | (2013.01) |
| *H04B 10/524* | (2013.01) |
| *H04B 10/50* | (2013.01) |
| *G03H 1/10* | (2006.01) |
| *H04B 10/508* | (2013.01) |
| *G03H 1/16* | (2006.01) |

(52) U.S. Cl.
CPC .......... *G02B 27/0012* (2013.01); *G02B 26/06* (2013.01); *G02F 2203/18* (2013.01); *G02F 2203/50* (2013.01); *G03H 1/10* (2013.01); *G03H 1/16* (2013.01); *G03H 2225/32* (2013.01); *H04B 10/508* (2013.01); *H04B 10/50577* (2013.01); *H04B 10/516* (2013.01); *H04B 10/524* (2013.01); *H04B 10/548* (2013.01)

(58) Field of Classification Search
CPC ................ H04B 10/548; H04B 10/516; H04B 10/50577; H04B 10/508; H04B 10/524; G02F 2203/18; G02F 2203/50; G02F 2033/12; G03H 2225/32; G03H 1/10; G03H 1/16
USPC ................ 359/11, 279, 300, 338; 250/201.9; 398/150, 188, 189; 348/536
See application file for complete search history.

(56) References Cited

U.S. PATENT DOCUMENTS

| | | | | |
|---|---|---|---|---|
| 5,587,832 A | * | 12/1996 | Krause ................. | G02B 21/004 250/216 |
| 8,817,255 B2 | * | 8/2014 | Masumura ........... | A61B 5/0073 356/338 |
| 2011/0109962 A1 | * | 5/2011 | Cui ....................... | A61B 5/0059 359/385 |

* cited by examiner

*Primary Examiner* — Evelyn A Lester
(74) *Attorney, Agent, or Firm* — Marshall, Gerstein & Borun LLP

(57) ABSTRACT

A single-channel phase conjugation apparatus includes a spatial light modulator and a single-channel optical sensing and generating unit. The spatial light modulator receives a light having a wavefront scattered by a scattering object. The single-channel optical sensing and generating unit senses a phase control wavefront of an output light focused by the spatial light modulator and outputs a light having a phase conjugation wavefront by changing a direction of the output light in a reverse direction depending on the phase control wavefront.

15 Claims, 4 Drawing Sheets

APPARATUS AND METHOD FOR SINGLE-CHANNEL DIGITAL OPTICAL PHASE CONJUGATION

CROSS-REFERENCE TO RELATED APPLICATIONS

A claim for priority under 35 U.S.C. § 119 is made to Korean Patent Application No. 10-2014-0124924 filed Sep. 19, 2014, in the Korean Intellectual Property Office, the entire contents of which are hereby incorporated by reference.

BACKGROUND

The inventive concepts described herein relate to digital optical phase conjugation capable of making a scattered wave go back to an original wave source, based on a time-reversal characteristic of a wave.

The term "phase conjugation" is used to describe a phenomenon where after measuring of a scattered wave, the scattered wave is gone back to an original wave source according to a time-reversal characteristic of a wave when the scattered wave is returned with its phase inverted. In particular, the phase conjugation is mostly used for application techniques of fields including the following: sounds, ultrasonic waves, microwaves, or radio waves easy to measure a phase. However, since it is difficult to measure a phase with respect to a short wavelength, the practical use of the phase conjugation is not much in a visible light range.

A holographic crystal is mainly used for the phase conjugation in the visible light range. The holographic crystal generates phase conjugated light by recording a desired wavefront at a crystal together with reference light and changing the direction of the reference light. Problems caused when the crystal is practically used includes the following: restriction on a wavelength used to record information at the crystal, long time taken upon recording of light and separate time required upon recoding another wavefront at the crystal.

Thus, there is required a technique capable of generating phase conjugated light regardless of the length of wavelength and making it possible to produce phase conjugation faster.

SUMMARY

One aspect of embodiments of the inventive concept is directed to provide a single-channel phase conjugation apparatus which includes a spatial light modulator and a single-channel optical sensing and generating unit. The spatial light modulator receives a light having a wavefront scattered by a scattering object. The single-channel optical sensing and generating unit senses a phase control wavefront of an output light focused by the spatial light modulator and outputs a light having a phase conjugation wavefront by changing a direction of the output light in a reverse direction depending on the phase control wavefront.

The single-channel optical sensing and generating unit may sense the phase control wavefront using a predetermined algorithm.

The spatial light modulator may focus an intensity of the light having the scattered wavefront on the single-channel optical sensing and generating unit.

A difference between a wavelength of the light having the phase conjugation wavefront and a wavelength of a light from the spatial light modulator may be smaller than or equal to a reference wavelength.

The single-channel optical sensing and generating unit may output a light having the phase conjugation wavefront as reversely changing a phase of a light depending on the phase control wavefront.

The single-channel optical sensing and generating unit may restore a light from the spatial light modulator to a light before scattering of the scattering object as reversely changing a direction of a light depending on the phase control wavefront.

The single-channel optical sensing and generating unit may be a pinhole or a single-mode optical fiber.

The single-channel phase conjugation apparatus may further include at least one of a polarization plate, a dichroic filter, a mirror, and a lens, the at least one being disposed between the spatial light modulator and the single-channel optical sensing and generating unit.

Another aspect of embodiments of the inventive concept is directed to provide a single-channel phase conjugation method which includes providing a light having a wavefront scattered by a scattering object to a spatial light modulator; sensing a phase control wavefront of an output light focused by the spatial light modulator; and outputting a light having a phase conjugation wavefront by changing a direction of the output light in a reverse direction depending on the phase control wavefront.

The sensing of a phase control wavefront may include sensing the phase control wavefront using a predetermined algorithm.

The single-channel phase conjugation method may further include focusing an intensity of the light having the scattered wavefront on a single-channel optical sensing and generating unit.

A difference between a wavelength of the light having the phase conjugation wavefront and a wavelength of a light from the spatial light modulator may be smaller than or equal to a reference wavelength.

The outputting of a light may include outputting the light having the phase conjugation wavefront by reversely changing a phase of a light depending on the phase control wavefront.

The outputting of a light may include restoring a light from the spatial light modulator to a light before scattering of the scattering object by reversely changing a direction of a light depending on the phase control wavefront.

Another aspect of embodiments of the inventive concept is directed to provide a single-channel phase conjugation apparatus which is adapted to receive a wave having a wavefront scattered by a scattering object, to sense a phase control wavefront of an output wave and to output a wave having a phase conjugation wavefront by changing a direction of the output wave in a reverse direction depending on the phase control wavefront.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
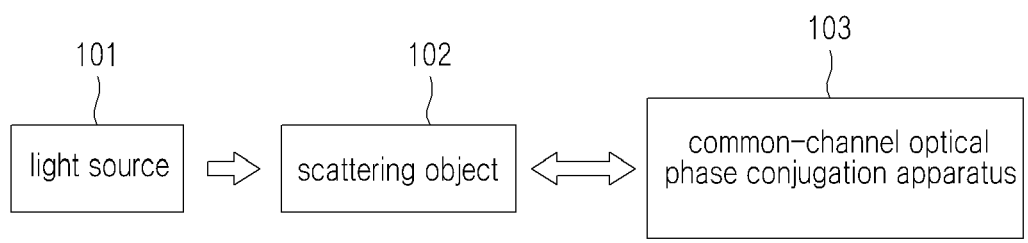
FIG. 1 is a block diagram schematically illustrating a single-channel optical phase conjugation system.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The phase conjugation may be produced using a spatial light modulator (SLM) and a camera or using only one SLM.

A digital optical phase conjugation technique that produces the phase conjugation using the spatial light modulator and the camera may obtain a phase conjugation image by producing the phase conjugation without a holographic crystal. For example, the phase conjugation may be produced through optical alignment between the spatial light modulator and the camera. The phase conjugation may occur when the optical alignment is made as finely as possible, for example, up to a unit of one pixel included in the camera.

A lens may be further used upon digital optical phase conjugation. At this time, aberration may occur due to a temperature or a pressure of the used lens. The phase conjugation may be made after the aberration is corrected every phase conjugation.

When the phase conjugation is produced using only one spatial light modulator, roles of the spatial light modulator and the camera needed at the phase conjugation are integrated into one spatial light modulator. For example, there are performed operations of sensing a wavefront of scattered light without the camera and generating phase-conjugated light, thereby making it possible to reduce complexity of system due to camera alignment and a phase conjugation time.

Below, operations of sensing a wavefront without a camera and producing the phase conjugation with roles of the spatial light modulator and the camera integrated in one spatial light modulator will be described with reference to accompanying drawings.

FIG. 1 is a block diagram schematically illustrating a single-channel optical phase conjugation system. Referring to FIG. 1, a single-channel optical phase conjugation system 100 contains a light source 101, a scattering object 102, and a single-channel optical phase conjugation apparatus 103.

The light source 101 emits light to the scattering object 102. For example, a laser, a laser diode, or a light-emitting diode may be used as the light source 101, and various types of waves, such as sounds, microwaves, ultrasonic waves, and visible light, may be used.

The scattering object 102 scatters and outputs incident light from the light source 101. For example, the scattering object 102 may be a body tissue or a part of the body tissue.

When the phase conjugation technique is applied to the bio-medicine field, the light source 101 emits light to a to-be-tested object (e.g., human body or animal) to check or treat lesions (e.g., cancer). The light incident onto the to-be-tested object is scattered according to a characteristic of the tissue of the to-be-tested object, and the scattered light is output out of the to-be-tested object. The light penetrating the to-be-tested object after scattering is transmitted to the single-channel optical phase conjugation apparatus 103.

The single-channel optical phase conjugation apparatus 103 detects a wavefront of the scattered light and generates phase-conjugated light depending on the detected wavefront.

For example, the single-channel optical phase conjugation apparatus 103 may detect a phase control wavefront corresponding to the scattered light by means of a predetermined algorithm. The single-channel optical phase conjugation apparatus 103 generates phase-conjugated light depending on the detected phase control wavefront. At this time, the phase-conjugated light may be used as a light source. In other words, the phase-conjugated light may be emitted to the to-be-tested object, the scattering object. For example, when light for cancer treatment is phase conjugated, the phase-conjugated light is incident onto the to-be-tested object, so it is only adhered to cancer cells. That is, the cancer cells are removed.

Below, an operation where a single-channel phase conjugation apparatus produces phase conjugation will be more fully described with reference to FIG. 2.

Figure 2:
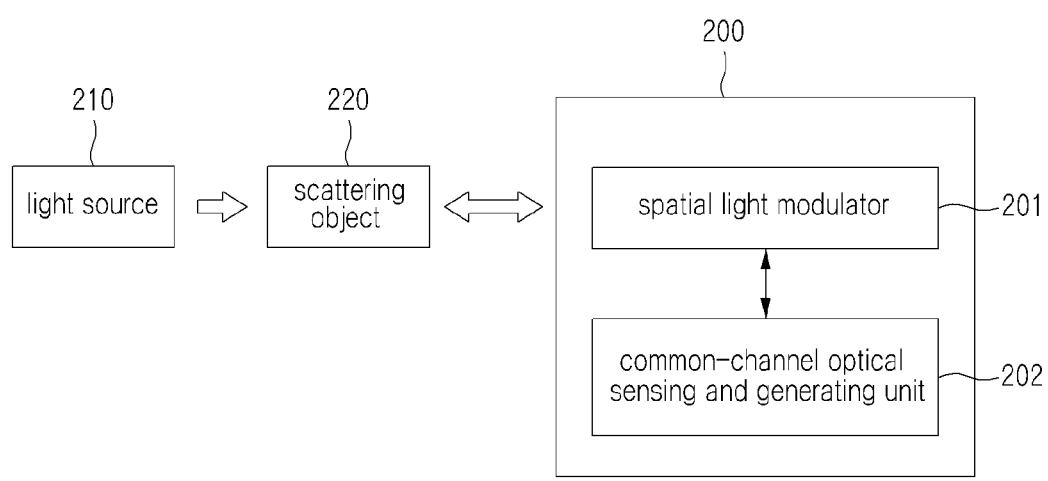
FIG. 2 is a block diagram schematically illustrating an internal configuration of a single-channel phase conjugation apparatus according to an embodiment of the inventive concept.

FIG. 2 is a block diagram schematically illustrating an internal configuration of a single-channel phase conjugation apparatus according to an embodiment of the inventive concept.

Referring to FIG. 2, a single-channel phase conjugation apparatus 200 contains a spatial light modulator 201 and a single-channel optical sensing and generating unit 202.

The spatial light modulator 201 receives light of a scattered wavefront from a scattering object 220 to control a phase of the received light.

For example, the spatial light modulator 201 focuses a scattered light to be sensed. For example, in the event that the spatial light modulator 201 modulates the scattered light to be sensed, the scattered light is transformed into a plane wave even as phase patterns of the spatial light modulator 201 and the scattered light are matched at a one to one ratio. In case of the plane wave, since the intensity of light is high, the spatial light modulator 201 focuses plane waves to output the focused plane waves to the single-channel optical sensing and generating unit 202.

The single-channel optical sensing and generating unit 202 senses a phase control wavefront of the light focused through the spatial light modulator 201.

The single-channel optical sensing and generating unit 202 senses a phase control wavefront where light from the spatial light modulator 201 is focused on the single-channel optical sensing and generating unit 202 as much as possible, using a predetermined algorithm. For example, as the intensity of light from the spatial light modulator 201 is focused on a predetermined focal point, the single-channel optical sensing and generating unit 202 senses a phase control wavefront about the focused light. For example, the predetermined algorithm may be iterative algorithm.

Here, the iterative algorithm is collectively referred to as all algorithms for focusing the intensity of light through a plurality of measuring operations to search an optimal phase control wavefront. For example, the iterative algorithm may include algorithm for searching an optimal phase value every pixel, algorithm for searching an optimal phase pattern based on genetic algorithm, or algorithm for searching an optimal phase pattern by assigning a measurement frequency to each pixel and Fourier transforming a measured result.

A wavelength of light having a scattered wavefront to be sensed may be equal to or similar to that of a light source used upon phase conjugation. In other words, a wavelength of light focused on the single-channel optical sensing and generating unit 202 through the spatial light modulator 201 may be equal to or similar to that of a light source used upon phase conjugation.

For example, when a difference between a wavelength of light having the scattered wavefront and a wavelength of phase-conjugated light is smaller than or equal to a reference wavelength, the wavelengths may be viewed as being equal or similar to each other. Similarity between the two wavelengths is based on a characteristic of a scattering object 220. Thus, the reference wavelength is predetermined according to the characteristic of the scattering object 220.

A spectrum bandwidth of light to be used upon sensing of the phase control wavefront may vary with the characteristic of the scattering object 220. For example, when the degree of scattering of the scattering object 220 is over a reference value, a path difference between paths that light penetrating the scattering object 220 experiences may increase. As the path difference increases, the probability that light having a wide bandwidth is focused on a single channel may decrease.

An optical resolution of focused light transmitted from the spatial light modulator 201 to the single-channel optical sensing and generating unit 202 is determined based on an area of the spatial light modulator 201. At this time, if a lens, a polarization plate, a dichroic filter, or a mirror is placed between the spatial light modulator 201 and the single-channel optical sensing and generating unit 202, the optical resolution may be determined based on a lens, a polarization plate, a dichroic filter, or a mirror as well as an area of the spatial light modulator 201.

The single-channel optical sensing and generating unit 202 generates light having a phase-conjugated wavefront by changing the direction of light into a reverse direction depending on the phase control wavefront. For example, the phase control wavefront may include an optimal phase pattern. The single-channel optical sensing and generating unit 202 produces phase conjugation as changing the direction of incident light focused by the spatial light modulator 201 into a reverse direction with the optimal phase pattern retained According to the above description, the single-channel optical sensing and generating unit 202 only changes the direction of incident light into the reverse direction, thereby making it possible to restore light emitted from a light source 210 to light before scattering due to the scattering object 220. In other words, the single-channel optical sensing and generating unit 202 generates phase-conjugated light as reversely changing a phase of incident light depending on the phase control wavefront. Here, a wavelength of the phase-conjugated light may be equal or similar to that of light output from the spatial light modulator 201 for sensing of the phase control wavefront.

A pinhole having the size that is not distinguishable with the optical resolution of incident light focused at the spatial light modulator 201 or a single-channel optical fiber may be used as the single-channel optical sensing and generating unit 202.

For example, when the pinhole is used, light output from the spatial light modulator 201 may be focused on the pinhole using a lens. When the single-channel optical fiber is used, light output from the spatial light modulator 201 may be focused on the single-channel optical fiber by changing a port connected for sensing of the phase control wavefront into a port for production of the phase conjugation.

Although not shown in FIG. 2, the single-channel phase conjugation apparatus 200 may further include a lens, a polarization plate, a dichroic filter, or a mirror between the spatial light modulator 201 and the single-channel optical sensing and generating unit 202 such that scattered light is better focused on the single-channel optical sensing and generating unit 202.

Figure 3:
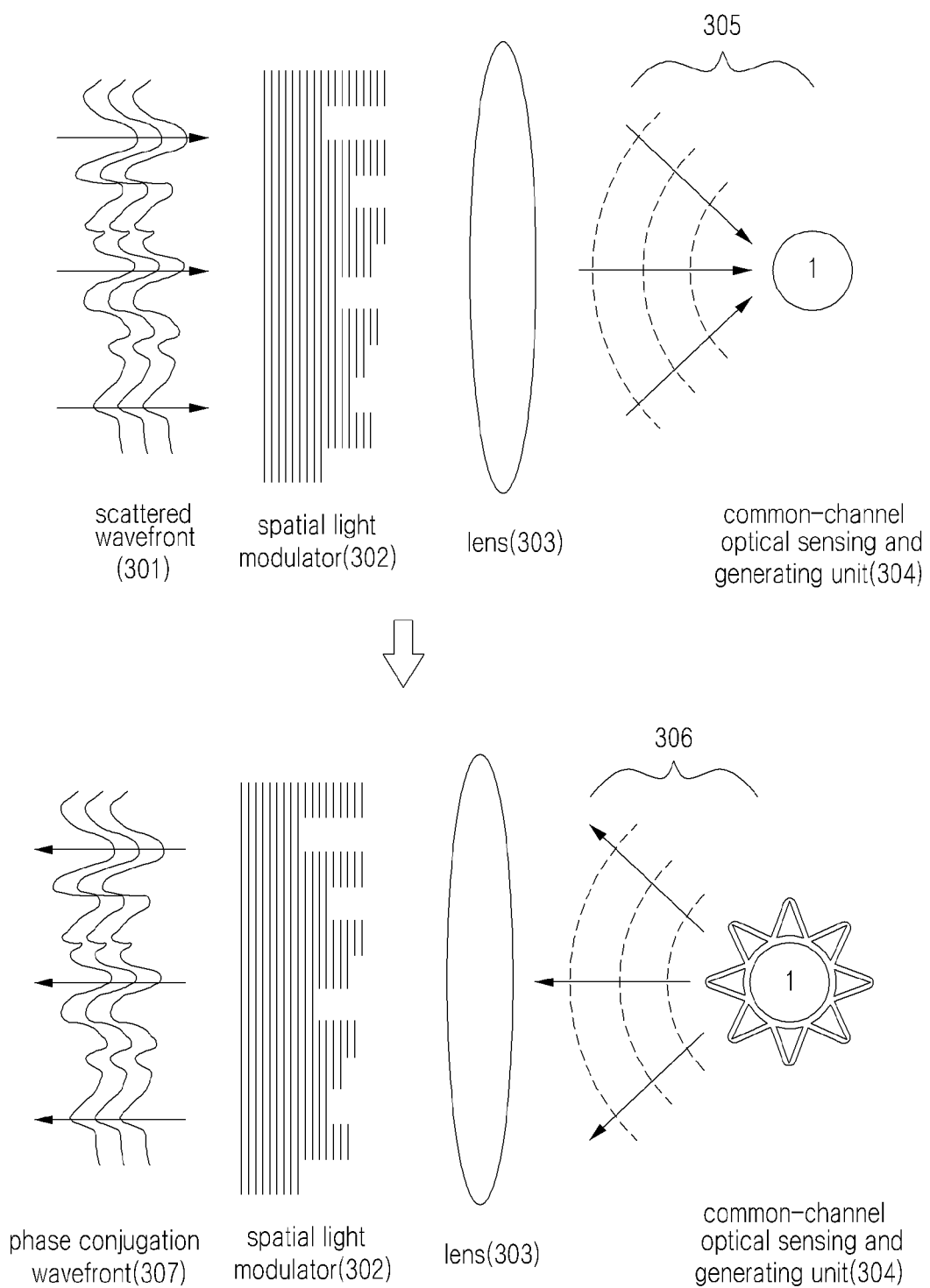
FIG. 3 is a diagram for describing an operation of focusing light using a lens, according to an embodiment of the inventive concept.

FIG. 3 is a diagram for describing an operation of focusing light using a lens, according to an embodiment of the inventive concept.

Referring to FIG. 3, light that has a scattered wavefront and penetrates a scattering object is incident on a spatial light modulator 302. The spatial light modulator 302 focuses the incident light and outputs the focused light to a single-channel optical sensing and generating unit 304. The single-channel optical sensing and generating unit 304 senses a phase control wavefront of the focused light using a predetermined algorithm, such as iterative algorithm.

At this time, a lens 303 is disposed between the spatial light modulator 302 and the single-channel optical sensing and generating unit 304 such that light incident on the spatial light modulator 302 is focused on the single-channel optical sensing and generating unit 304 as much as possible. Here, as well as the lens 303, a polarization plate, a dichroic filter or a mirror may be further placed between the spatial light modulator 302 and the single-channel optical sensing and generating unit 304 to help focusing of light.

The single-channel optical sensing and generating unit 304 generates light having a phase-conjugated wavefront 307 as only changing the direction of light from the spatial light modulator 302 in a reverse direction 306 depending on a phase control wavefront.

Figure 4:
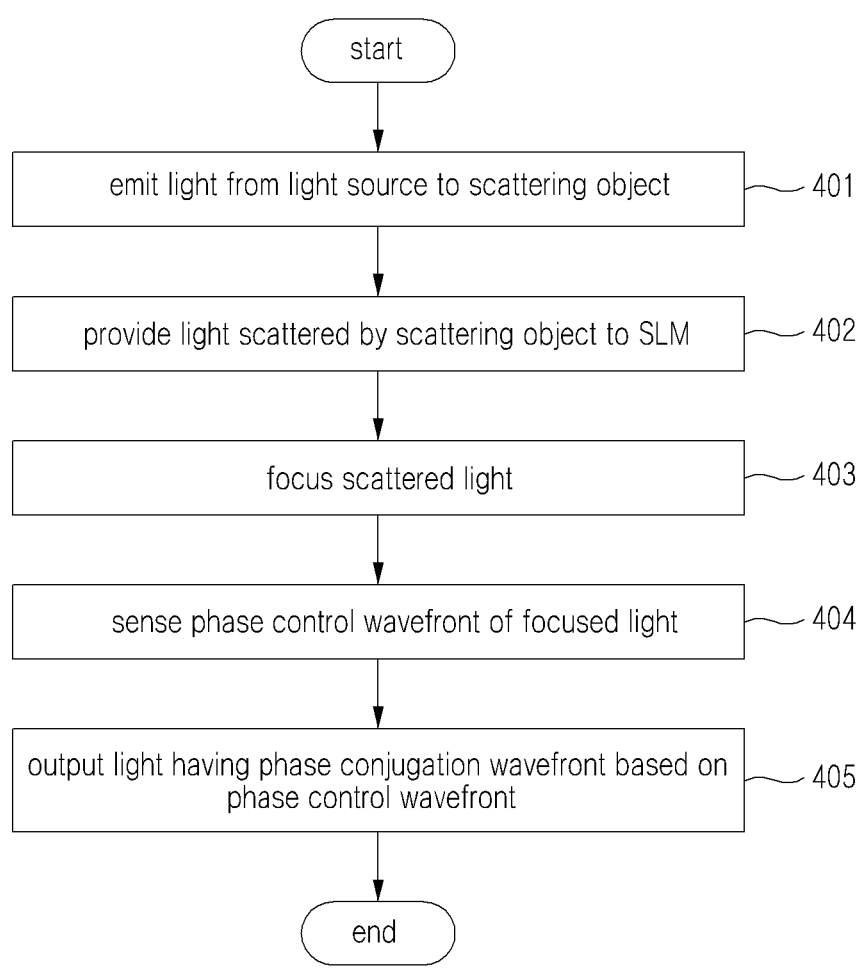
FIG. 4 is a flow chart for describing a single-channel optical phase conjugation method according to an embodiment of the inventive concept.

FIG. 4 is a flow chart for describing a single-channel optical phase conjugation method according to an embodiment of the inventive concept.

In FIG. 4, steps 401 through 405 may be executed by a spatial light modulator 201 and a single-channel optical sensing and generating unit 202 shown in FIG. 2.

In step 401, a light source emits light to a scattering object. For example, a laser, a laser diode, or a light-emitting diode may be used as the light source 101.

In step 402, the light incident on the scattering object is scattered by the scattering object, and the scattered light is incident on a spatial light modulator 201. In other words, light having a scattered wavefront is incident on the spatial light modulator 201.

In step 403, the spatial light modulator 201 focuses the incident light on a single-channel optical sensing and generating unit 202. At this time, a lens, a dichroic filter, a polarization plate, or a mirror may be further used such that light is focused on the single-channel optical sensing and generating unit 202 as much as possible.

For example, upon modulating of the scattered light to be sensed, the spatial light modulator 201 outputs light corresponding to a plane wave to the single-channel optical sensing and generating unit 202. At this time, the spatial light modulator 201 may focus light by outputting plane waves to a predetermined focal point in the single-channel optical sensing and generating unit 202.

In step 404, the single-channel optical sensing and generating unit 202 senses a phase control wavefront of the focused light using a predetermined algorithm.

In step 405, the single-channel optical sensing and generating unit 202 generates light having a phase conjugation wavefront depending on the phase control wavefront.

For example, the single-channel optical sensing and generating unit 202 only changes the direction of the focused light in a reverse direction while retaining an optimal phase pattern depending on the phase control wavefront. In other words, the single-channel optical sensing and generating unit 202 generates light having a phase-conjugated wavefront by reversely changing a phase of light.

According to the above description, the phase-conjugated light focuses a lot of light energy on a particular region (e.g., cancer or tumor) without affecting any other regions of a body. In other words, sensing of a wavefront using the spatial light modulator allows light energy to be focused on a target region of a body without affecting any other regions of the body, thereby making it possible to be used for the bio-medicine techniques, such as light-based surgery or treatment.

A description omitted in FIG. 4 may refer to FIGS. 1 through 3.

As described with reference to FIGS. 2 through 4, the single-channel phase conjugation apparatus 200 produces phase conjugation using only one spatial light modulator (SLM) without a camera, thereby making it possible to reduce the number of pixels needed for light alignment between the spatial light modulator and the camera over half and to produce phase conjugation more easily without complex alignment.

In addition, an unified single-channel phase conjugation apparatus 200 may be provided as a wavelength of light and a wavelength of phase-conjugated light are used equally or similarly upon sensing of the phase control wavefront. Thus, sustainability and practicality of the single-channel phase conjugation apparatus 200 may be improved.

According to the above description, since optical phase conjugation is possible only by a spatial light modulator (SLM), phase-conjugated light may be generated with respect to all waves regardless of the length of wavelength.

Also, the phase conjugation is produced through only one spatial light modulator without alignment of pixels of a camera, thereby making it possible to reduce a phase conjugation time and the size of apparatus.

The present invention described with reference to exemplary embodiments may be applied to any electromagnetic wave such as X-ray, infrared, terahertz, microwave, and the like as well as a sound wave.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:
1. A single-channel phase conjugation apparatus, comprising:
 a single-channel optical sensing and generating unit; and
 a spatial light modulator configured to receive a light
  having a wavefront scattered by a scattering object and focus the light by outputting the light to the single-channel optical sensing and generating unit, wherein the single-channel optical sensing and generating unit is configured to sense a phase control wavefront of the output light focused by the spatial light modulator and to output light having a phase conjugation wavefront by changing a direction of the output light in a reverse direction depending on the phase control wavefront.

2. The single-channel phase conjugation apparatus of claim 1, wherein the single-channel optical sensing and generating unit senses the phase control wavefront using a predetermined iterative algorithm for focusing an intensity of the light through a plurality of measuring operations to search for an optimal phase control wavefront.

3. The single-channel phase conjugation apparatus of claim 1, wherein the spatial light modulator focuses an intensity of the light having the scattered wavefront on the single-channel optical sensing and generating unit.

4. The single-channel phase conjugation apparatus of claim 1, wherein a difference between a wavelength of the light having the phase conjugation wavefront and a wavelength of the output light from the spatial light modulator is smaller than or equal to a reference wavelength.

5. The single-channel phase conjugation apparatus of claim 1, wherein the single-channel optical sensing and generating unit outputs the light having the phase conjugation wavefront as reversely changing a phase of the output light depending on the phase control wavefront.

6. The single-channel phase conjugation apparatus of claim 1, wherein the single-channel optical sensing and generating unit restores the output light from the spatial light modulator to a light before scattering of the scattering object as reversely changing a direction of the output light depending on the phase control wavefront.

7. The single-channel phase conjugation apparatus of claim 1, wherein the single-channel optical sensing and generating unit is a pinhole or a single-channel optical fiber.

8. The single-channel phase conjugation apparatus of claim 1, further comprising:
at least one of a polarization plate, a dichroic filter, a mirror, and a lens, the at least one being disposed between the spatial light modulator and the single-channel optical sensing and generating unit.

9. A single-channel phase conjugation method, comprising:
receiving, by a spatial light modulator, a light having a wavefront scattered by a scattering object;
focusing, by the spatial light modulator, the light by outputting the light to a single-channel optical sensing and generating unit;
sensing, by the single-channel optical sensing and generating unit, a phase control wavefront of the focused light; and
outputting, by the single-channel optical sensing and generating unit, light having a phase conjugation wavefront by changing a direction of the focused light in a reverse direction depending on the phase control wavefront.

10. The single-channel phase conjugation method of claim 9, wherein the sensing of a phase control wavefront includes:
sensing the phase control wavefront using a predetermined iterative algorithm for focusing an intensity of the light through a plurality of measuring operations to search for an optimal phase control wavefront.

11. The single-channel phase conjugation method of claim 9, further comprising:
focusing an intensity of the light having the scattered wavefront on a single-channel optical sensing and generating unit.

12. The single-channel phase conjugation method of claim 9, wherein a difference between a wavelength of the light having the phase conjugation wavefront and a wavelength of the focused light from the spatial light modulator is smaller than or equal to a reference wavelength.

13. The single-channel phase conjugation method of claim 9, wherein the outputting of a light includes:
outputting the light having the phase conjugation wavefront by reversely changing a phase of a light depending on the phase control wavefront.

14. The single-channel phase conjugation method of claim 9, wherein the outputting of a light includes:
restoring a light from the spatial light modulator to a light before scattering of the scattering object by reversely changing a direction of a light depending on the phase control wavefront.

15. A single-channel phase conjugation apparatus, comprising:
a light source configured to emit light to a scattering object;
a single-channel optical sensing and generating unit; and
a spatial light modulator configured to receive the light having a wavefront scattered by the scattering object and focus the light by outputting the light to the single-channel optical sensing and generating unit,
wherein the single-channel optical sensing and generating unit is configured to sense a phase control wavefront of the focused light to restore the light emitted from the light source to light before scattering due to the scattering object by changing a direction of the focused light in a reverse direction depending on the phase control wavefront.

* * * * *